UNITED STATES PATENT OFFICE.

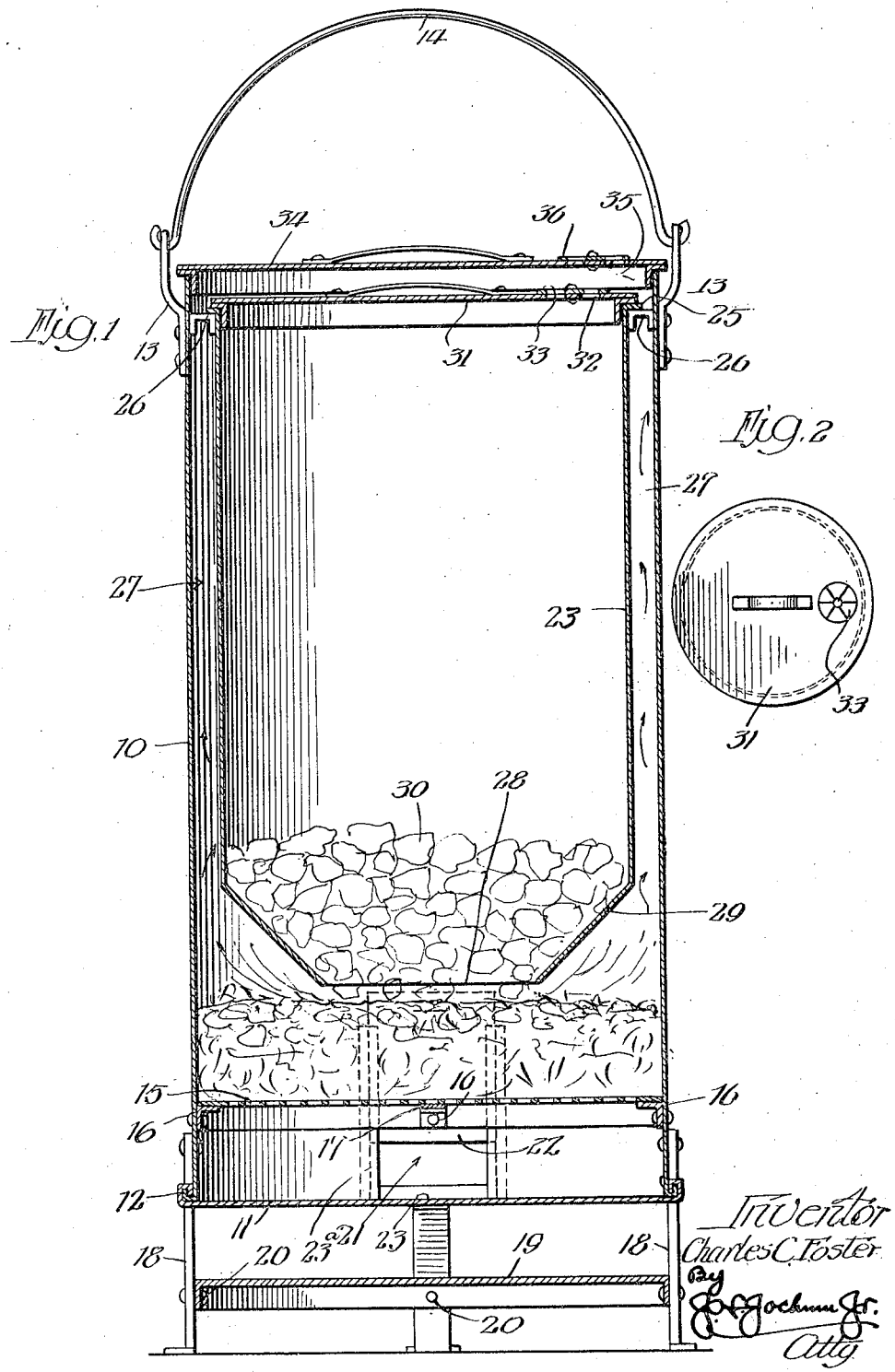

CHARLES C. FOSTER, OF CHICAGO, ILLINOIS.

STOVE.

1,353,826.

Specification of Letters Patent.   Patented Sept. 28, 1920.

Application filed February 21, 1916. Serial No. 79,499.

*To all whom it may concern:*

Be it known that I, CHARLES C. FOSTER, a citizen of the United States, residing at Chicago, in the county of Cook and State of Illinois, have invented certain new and useful Improvements in Stoves, of which the following is a specification.

This invention relates to improvements in portable stoves, particularly adapted though not necessarily limited in its use for heating freight cars containing perishable goods, to prevent the goods from becoming damaged from frost or from being frozen.

A further object is to provide an improved device of this character, which will be simple, durable and cheap in construction and effective and efficient in operation.

To the attainment of these ends and the accomplishment of other new and useful objects, as will appear, the invention consists in the features of novelty in substantially the construction, combination and arrangement of the several parts hereinafter more fully described and claimed, and shown in the accompanying drawing illustrating this invention and in which:

Figure 1 is a vertical longitudinal sectional view of an improved device of this character, constructed in accordance with the principles of this invention.

Fig. 2 is a top plan view of one of the covers or closures.

Referring more particularly to the drawing, the numeral 10 designates an inclosing casing, which may be of any desired size and configuration, and constructed of any suitable sheet material, such as metal or the like. This casing is provided with a bottom 11, which is secured in position in any suitable manner, preferably by flanging or seaming the edges of the bottom and the casing as shown at 12.

The top of the casing is open and secured to the casing are ears 13, to which a suitable handle 14 is pivotally connected and by means of which handle the apparatus may be transported.

Arranged within the casing and adjacent the lower extremity, but spaced above the bottom 11 thereof, is a grate 15, which is preferably constructed of perforated sheet material, and this grate is held in position in any suitable manner, such as by means of brackets 16 upon which the grate rests and which brackets are secured to the inner face of the casing wall. If desired and in order to support the center of the grate, a bar or rod 17 may be provided which extends beneath the grate and rests upon the brackets 16 and upon which bar, the grate rests.

Legs 18 are provided for supporting the casing and the bottom 11 of the casing is held some distance above the floor, so that a shield 19 preferably in the form of sheet material may be disposed between the bottom 11 of the casing and the floor and this shield is supported preferably by means of fastening devices 20 engaging the shields and the legs. By the provision of this shield, it will be noted that an air space will be formed beneath the bottom 11, and another air space will be formed between the shield and the floor so that in operation there will be a circulation of air beneath the bottom of the casing and on both sides of the shield, so as to protect the floor. The casing is also provided with an opening 21, arranged adjacent the bottom 11 and by means of which opening the ashes may be removed from the casing and this opening is adapted to be closed by a closure 22 which slides in suitable guides 23$^a$. The closure 22 may also be opened for the purpose of causing a draft in the casing. Arranged within the casing is a hopper 23 which is also constructed of any suitable sheet material, such as metal. This hopper is of a diameter somewhat smaller than the diameter of the casing 10, so that when the hopper is placed within the casing and the flange 25 of the hopper engages and rests upon the brackets or spacing members 26 arranged adjacent the top of the casing, the hopper will be suspended thereby and an air space 27 will be formed between the hopper and the casing and in which space the heated air circulates.

The bottom of the hopper is open as at 28 and the extremity of the hopper is contracted or deflected as shown at 29 so as to insure the proper feeding of the fuel 30. The extremity of the hopper is arranged some distance above the grate 15 and the hopper is adapted to be closed by a removable closure 31 which latter is provided with a vent opening 32 and the vent opening is controlled by a damper 33.

A similar closure 34 is provided for the outer casing and the two closures are spaced from each other so that the heated air will circulate across the top of the hopper. This closure 34 is provided with a similar vent opening 35, controlled by a damper or closure 36.

With this apparatus, the fuel to be employed is a specially prepared or artificial fuel, now on the market and is adapted to be burned without smoke, gas or flame, and when the apparatus is started, it is adapted to be placed within a freight car or any other room or inclosure, for the purpose of preventing perishable goods contained in the car or inclosure from freezing and can be transported when desired.

In operation, and in order to start the apparatus, a quantity of the fuel is placed upon the grate 15 and this fuel is ignited in any suitable manner such as by pouring a small quantity of alcohol on the fuel and then igniting the same. The hopper is then placed in position within the casing and the fuel 30 is placed within the hopper, the quantity of fuel used, being determined by the length of time it is desired to use the apparatus. The closure 31 is then placed upon the hopper, as is also the closure 34 placed upon the casing. When it is desired to increase the temperature, the closure 22 is opened as is also the closure 33, and the closure 36, so as to create a draft through the hopper. When the fuel has become sufficiently ignited, then the closures 36 and 33 may be closed, as may also the closure 22.

As the fuel burns, it will be automatically fed to the fire bed upon the grate 15, and as the fuel is consumed, the ashes will drop through the grate 15 on to the bottom 11 of the casing from where they may be removed through the opening 21.

By the provision of the space between the hopper and the casing, heated air will circulate through the space and over the top of the hopper, thereby not only distributing heated air, but also prevents the outer casing from becoming too hot.

With this improved construction it will be manifest that a light simple and durable device is provided and the hopper may be readily removed at any time by simply removing the closure 34 and lifting the hopper out of the casing. Furthermore, there will be no smoke, gas or flame in the apparatus which would have a tendency to injure or cause the goods to deteriorate.

It has been found in practice that when the stove is once filled with small size fuel, it will burn twenty four hours giving a moderate heat, but when it is desired to produce a higher temperature, then one filling of the stove will be sufficient to last for from ten to twelve hours.

What is claimed as new is:

A portable stove of the character described embodying an outer casing having a closed bottom, brackets arranged within the casing near the top thereof, a fuel hopper, said hopper being of a diameter considerably smaller than the internal diameter of the casing and having an open and contracted bottom, a circumferential flange extending about the hopper at the top thereof, said flange being adapted to rest upon the said brackets to suspend the hopper within the casing, and said brackets also serving to hold the hopper spaced from the casing wall to form therewith a flue around the hopper, a grate disposed below and spaced from the hopper, said grate extending entirely across the outer casing and flue, a closure for the outer casing, there being an opening in the outer casing below the grate, guides on opposite sides of the opening, a closure for the opening and movable in the guides, there being a draft opening through the first recited closure and with which opening the said flue has communication, there being a draft opening with which the hopper has communication, a closure for each of the last said openings, supports for holding the bottom of the casing elevated above the bottom of the floor, and a shield secured to the supports and spaced below the bottom of the casing and above the floor.

In testimony whereof I have signed my name to this specification, in the presence of two subscribing witnesses, on this 18th day of February A. D. 1916.

CHARLES C. FOSTER.

Witnesses:
 IRMA M. BARING,
 J. H. JOCHUM, Jr.